US012756414B2

(12) United States Patent
Coban

(10) Patent No.: US 12,756,414 B2
(45) Date of Patent: Oct. 6, 2026

(54) WIDE-BAND PEAK DETECTION FOR AN RF RECEIVER

(71) Applicant: Silicon Laboratories Inc., Austin, TX (US)

(72) Inventor: Abdulkerim L. Coban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 226 days.

(21) Appl. No.: 18/374,843

(22) Filed: Sep. 29, 2023

(65) Prior Publication Data

US 2025/0112658 A1 Apr. 3, 2025

(51) Int. Cl.
*H04B 1/16* (2006.01)

(52) U.S. Cl.
CPC .................................... *H04B 1/16* (2013.01)

(58) Field of Classification Search
None
See application file for complete search history.

(56) References Cited

U.S. PATENT DOCUMENTS

| | | | | |
|---|---|---|---|---|
| 10,033,364 | B1 | 7/2018 | Coban | |
| 2014/0057584 | A1* | 2/2014 | Murphy | H04B 1/30 455/248.1 |
| 2022/0345090 | A1* | 10/2022 | Banerjee | H03F 3/45475 |
| 2023/0019152 | A1* | 1/2023 | Woo | H04B 1/005 |

FOREIGN PATENT DOCUMENTS

| | | | | | |
|---|---|---|---|---|---|
| CN | 114124123 | A | * | 3/2022 | H04B 1/16 |
| CN | 114553158 | A | * | 5/2022 | H04B 1/16 |
| WO | WO-2015200850 | A2 | * | 12/2015 | G01C 19/5747 |
| WO | WO-2017046068 | A1 | * | 3/2017 | H04B 10/6933 |

* cited by examiner

*Primary Examiner* — Mohammed Rachedine
(74) *Attorney, Agent, or Firm* — Zagorin Cave LLP

(57) ABSTRACT

A wideband power detector (peak or RMS) is placed in a base-band portion of a receiver chain implemented with a current mode RF front end. A differential transimpedance amplifier (TIA) includes a current sense circuit that replicates the input currents to the TIA as current sense output voltages without the current sense output voltages being affected by the filter characteristics of the TIA.

21 Claims, 12 Drawing Sheets

WIDE-BAND PEAK DETECTION FOR AN RF RECEIVER

BACKGROUND

Field of the Invention

This invention relates to radio frequency (RF) receivers and more particularly to generating signals for use by RF power detectors.

Description of the Related Art

FIG. 1 illustrates a high level block diagram of a portion of a receiver 100 of a prior art approach to detecting RF power in the receiver 100. The receive chain of receiver 100 includes an antenna 102 that provides an RF signal to passive network (PN) 104 that provides impedance matching, voltage gain, filtering, and electrostatic discharge protection. Low-noise amplifier (LNA) 106 amplifies the signal from passive network 104 without substantial degradation to the signal-to-noise ratio and provides the amplified RF signals to mixer 108. Mixer 108 performs frequency translation or shifting of the RF signals to a lower frequency, such as an intermediate frequency (IF) or baseband and supplies the baseband (or IF signals) to transimpedance amplifiers (TIAs) 110. The TIAs 110 supply their output signals to optional low pass filters (LPF) and programmable gain amplifiers (PGA) 112. The LPF and PGA circuits 112 supply their signals to analog to digital converters (ADCs) 114 and 116, which supply digital signals for further demodulation and other processing in portions of the receive chain not shown in FIG. 1. The phase-locked loop (PLL) 117 supplies clock signals to the ADCs 114 and 116.

The receiver 100 includes a peak detector 118 that detects peaks in the RF signal (or the root mean square (RMS) value of the RF signal) at the input to the LNA 106. The signals at that stage in the receiver can have high-frequency and low amplitude. For example, the RF frequencies may be in the Industrial, Scientific and Medical (ISM) band (2.4 to 2.485 GHZ). Such high frequencies require the use of smaller devices with low parasitics to handle the high frequencies but the small device size can lead to inaccuracies. In addition, the signals at the input to the LNA can be quite small, also leading to inaccuracies. Further, the peak detector 118 loads the output of the passive network 104, and therefore can lower signal amplification and reduces the accuracy of the amplified signal provided by LNA 106. The output of the peak detector 118 determines the power present in the RF signal and if the power is too high, control logic (not shown in FIG. 1) reduces the gain of the LNA to avoid undesirable effects such as signal distortion and/or clipping, leading to inaccuracies in demodulation.

Another approach utilizes peak detector 120 located at the output of the TIAs 110 in place of or in addition to the peak detector 118. The peak detector 120, however, receives a filtered signal from the TIAs and thus cannot detect an out of band blocker signal that is separated from the desired signal by a large frequency. Peak detector 120 is therefore only useful in detecting in band and/or close-in blockers. Thus, the use of peak detector 120 can also result in failing to attenuate amplification in the receive path when needed, leading to undesirable effects.

Accordingly, improvements in power detection in the receive path are desirable without the disadvantages described above.

SUMMARY OF EMBODIMENTS OF THE INVENTION

Accordingly, in one embodiment a method includes receiving a differential input current at a transimpedance amplifier (TIA) with input current sensing in a base-band portion of a receiver chain of a radio frequency (RF) receiver. The method further includes generating a current sense differential output voltage on first output node and a second output node of the TIA, the current sense differential output voltage corresponding to the differential input current to the TIA and the current sense differential output voltage being independent of filter characteristics of the TIA.

In another embodiment a radio frequency (RF) receiver includes a differential transimpedance amplifier (TIA) with input current sensing. The TIA includes a first branch that includes a first amplifier circuit that receives a first input current and supplies a first output voltage on a first output node. The TIA includes a second branch that has a second amplifier that receives a second input current and supplies a second output voltage on a second output node. A current sensing circuit includes a first current sense amplifier circuit and a second current sense amplifier circuit that are coupled respectively to the first input current and the second input current. The current sensing circuit supplies a third output voltage on a third output node indicative of the first input current and a fourth output voltage on a fourth output node indicative of the second input current. The current sensing circuit includes a load current compensation circuit that has a first compensation resistor coupled between the first output node and the fourth output node and a second compensation resistor coupled between the second output node and the third output node.

In another embodiment a radio frequency (RF) receiver includes a first amplifier circuit configured to generate a first output voltage on a first output node. The first output voltage corresponds to a first input current to the first amplifier circuit. The first output voltage depends in part on filter characteristics of the first amplifier circuit. A second amplifier circuit generates a second output voltage on a second output node. The second output voltage corresponds to a second input current to the second amplifier circuit and the second output voltage depends in part on filter characteristics of the second amplifier circuit. A current sense circuit includes a first current sense amplifier to generate a first current sense voltage on a first current sense output node. The first current sense voltage represents the first input current and the first current sense voltage is independent of the filter characteristics of the first amplifier circuit. A second current sense amplifier generates a second current sense voltage on a second current sense output node. The second current sense voltage represents the second input current and the second current sense voltage is independent of the filter characteristics of the second amplifier circuit. A load current compensation circuit has a first compensation resistor coupled between the first output node and the second current sense output node and a second compensation resistor is coupled between the second output node and the first current sense output node. The first amplifier circuit and the second amplifier circuit have a transconductance of $g_m$ and the first current sense amplifier and the second current sense amplifier have a transconductance of $g_m/N$, where N is greater than 1.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 2:
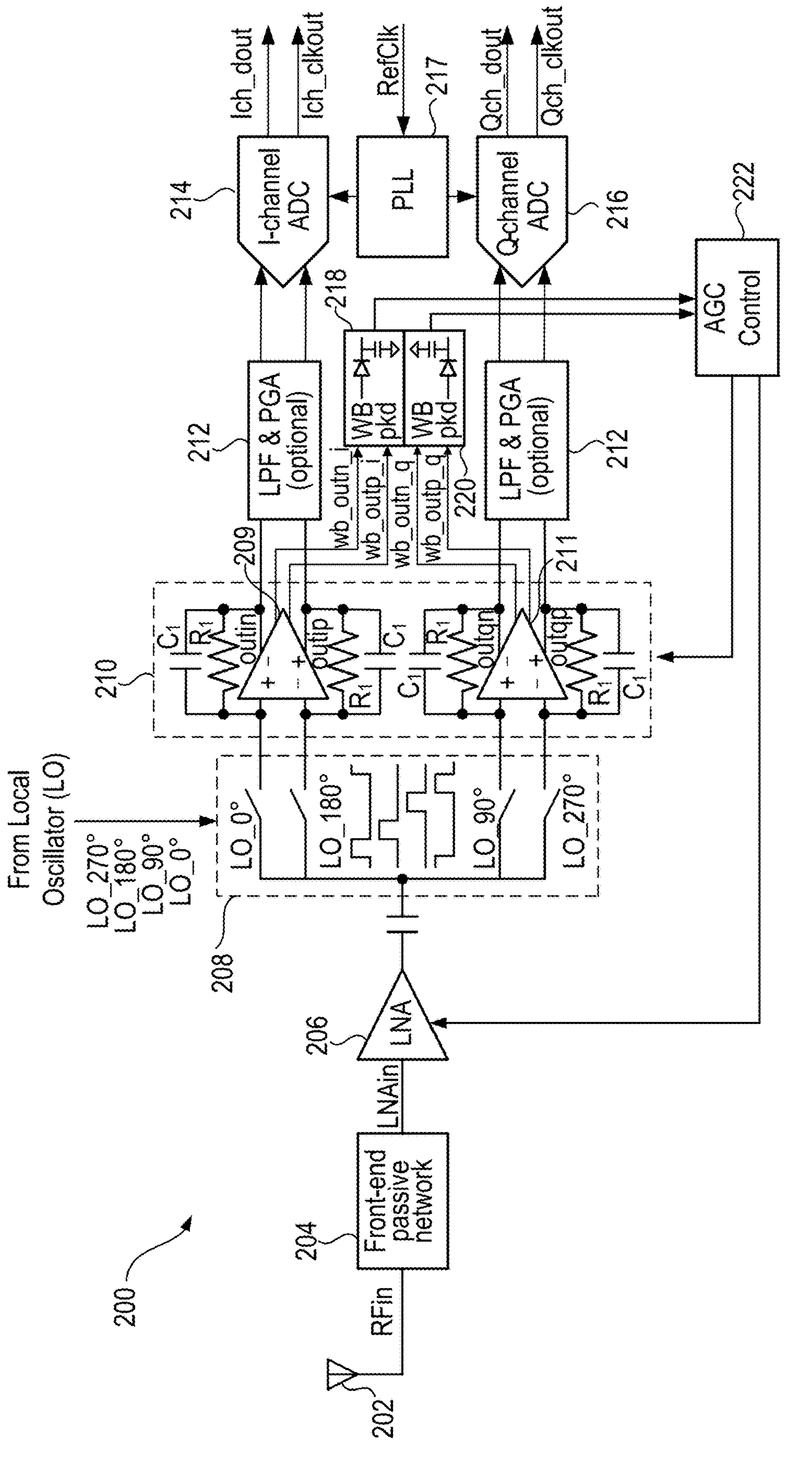
FIG. 2 illustrates an embodiment of a receiver having a wide-band power detector (peak or rms) placed in a base-band portion of the receiver chain.

FIG. 2 illustrates an embodiment of a portion of a receiver 200 having a wide-band power detector (peak or rms) placed in a base-band portion of the receiver chain of receiver 200. Antenna 202 provides an RF signal to passive network (PN) 204 that provides impedance matching, voltage gain, filtering, and electrostatic discharge protection. The front-end of the receiver 200 is implemented as a current mode receiver, which is widely used in industry, and has a low-noise transconductance amplifier (LNA) 206. The low-noise transconductance amplifier (LNA) 206 amplifies the low voltage RF signals provided from the PN 204 without substantial degradation to the signal-to-noise ratio and provides the amplified RF signals as a current to mixer 208. In the illustrated embodiment, the mixer 208 is a 25% duty-cycle passive-mixer operating in the current domain. The mixer receives local oscillator (LO) quadrature 25% duty clock signals of 0°, 180°, 90°, and 270° from a local oscillator. Mixer 208 performs frequency translation or shifting of the RF signals to a lower frequency, such as an intermediate frequency (IF) or baseband and supplies the baseband (or IF signals) to transimpedance amplifiers 210. The transimpedance amplifiers 210 provide additional filtering and amplification and convert the baseband current domain signals from the mixer 208 to voltage signals. The transimpedance amplifiers 210 supply differential signal path output signals (outin, outip, outqn, outqp) to optional low pass filters (LPF) and programmable gain amplifiers (PGA) 212. The LPF and PGA circuits 212 supply their signals to analog to digital converters (ADCs) 214 and 216, which supply digital signals for further demodulation and other processing in the receive chain. The phase-locked loop (PLL) 217 supplies clock signals to the ADCs 214 and 216. The TIAs 210 also supply differential wideband sense outputs (wb_outn_i, wb_outp_i, wb_outn_q, wb_outp_q) to the power detector circuit 218 and 220, which are placed in the base-band portion of the receive chain. The wide-band sense outputs are not affected by the filtering profile of the baseband signal chain, particularly the filtering profile of the TIAs 210. Therefore, the wide-band baseband peak detector detects blockers with a large frequency offset similar to an RF peak detector at the input of the LNA. The wide-band baseband peak detector approach is more accurate, however, as the input signal is amplified by the preceding stages until it reaches baseband and therefore the amplified signal is easier to detect. Equivalently, signals with lower signal powers can be detected or threshold levels can be set for lower RF levels. Unlike RF peak detectors at the input of the LNA 206 no calibration is needed as the wideband peak detector operates on amplified signals. Advantageously, the area and power overhead is small. In addition, moving the power detector from the RF front end reduces loading to the RF input of the LNA 206.

More accurate power detection provides an improved solution to the AGC operation (automatic gain control) of receivers especially for co-existence cases where multiple different RF protocols are present. Wideband peak detection at baseband is especially useful for accurate detection of any far-out or close-in blockers. That allows the AGC control function 222 to better control the amplification provided by the blocks with gain programmability capabilities: the LNA 206, transimpedance amplifiers 210, and/or PGA 212 in the receiver of 200. If the AGC control is inaccurate, suboptimal gain setting can affect blocking performance (for example too much amplification can result in distortion or clipping in the receive chain, reducing tolerable blocker power levels.) Note that the TIAs 210 include two TIA amplifiers 209 and 211 to handle the differential quadrature signals from the mixer 208.

The wide-band baseband peak detector approach described herein is particularly useful for co-existence scenarios of wireless systems operating in the same band (e.g., the 2.4 GHz ISM frequency band used by Bluetooth® Low Energy (BLE), Zigbee®, and WiFi® devices), and for various other short range wireless protocols. For example, a BLE/Zigbee receiver has to tolerate WiFi blockers in the ISM band (spans 2.4-2.485 GHz) and vice versa. Embodiments described herein are also suitable in other frequency bands, e.g., for WiFi receivers that operate in both 2.4 GHz and/or 5 GHz band.

Figure 1:
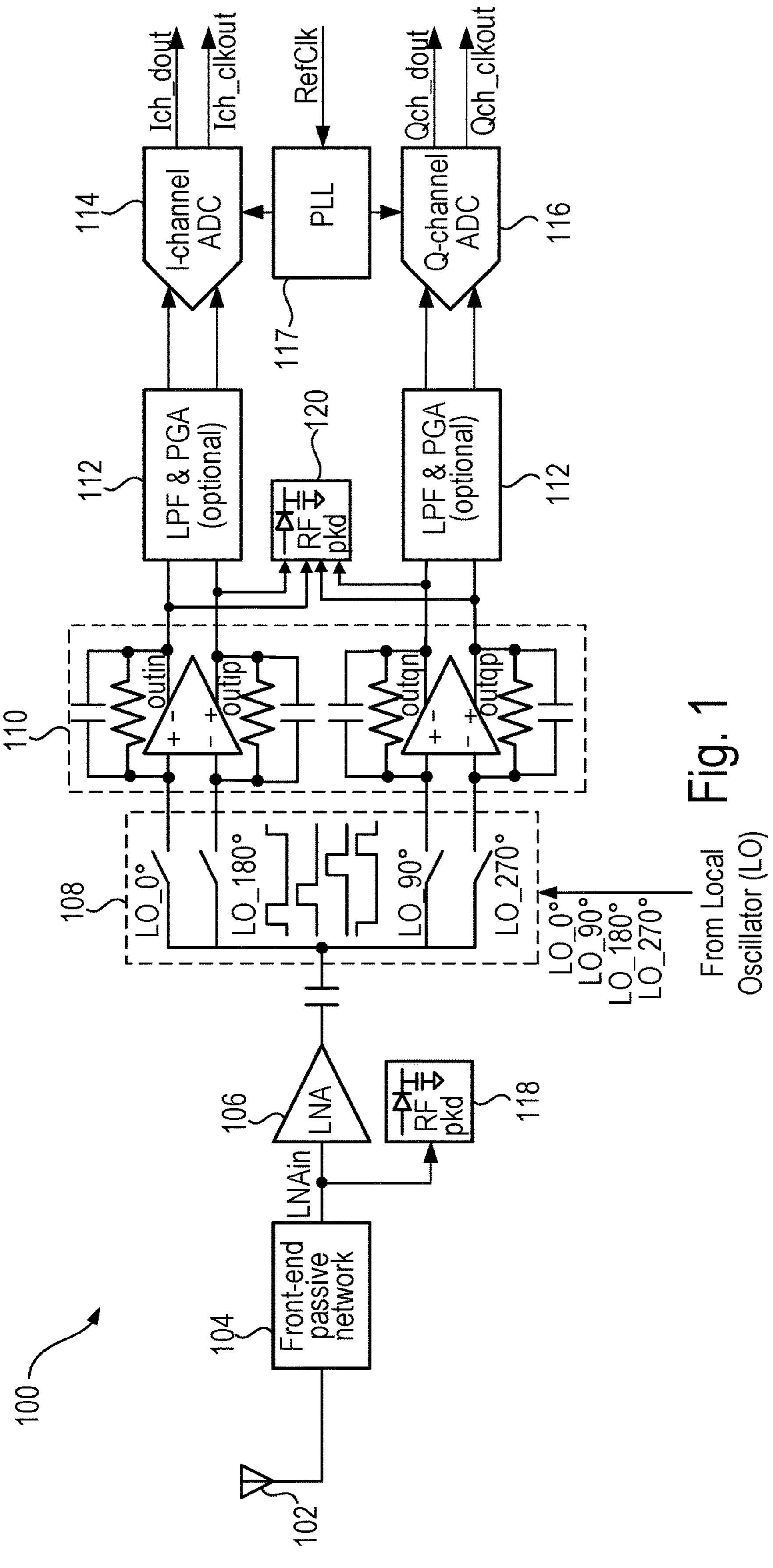
FIG. 1 illustrates a prior art approach to detecting RF power in a receiver.

A receiver chain with power detector(s) (rms or peak) located at baseband in the receive chain (at the TIA output) has a wide frequency range, however, the frequency range is narrower than the case with a power detector placed at LNA input as shown in FIG. 1. The frequency range is in the order of 100 MHz for low-power signal chain receivers (e.g., BLE, Zigbee). The frequency range can be set close to 1 GHz for higher-power receivers (e.g., WiFi).

Figure 3:
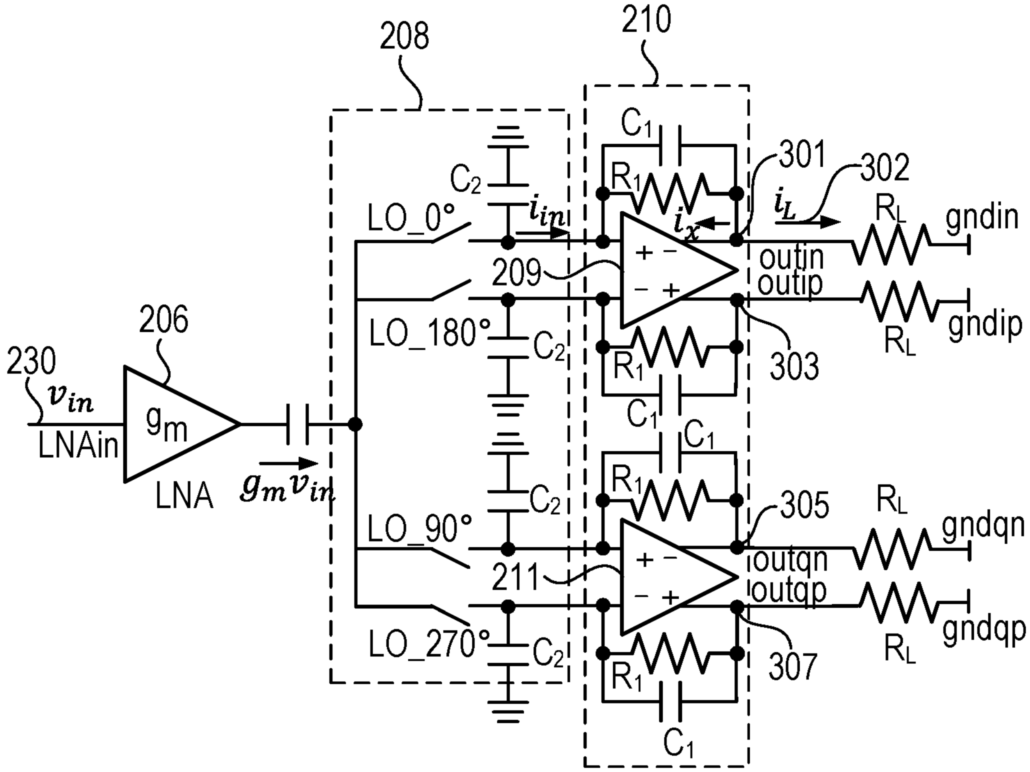
FIG. 3 illustrates some additional details of an embodiment of a current-mode RF front-end with a low-noise transconductance amplifier followed by a mixer operating in the current domain, followed by the transimpedance amplifier (TIA).

FIG. 3 illustrates some additional details of an embodiment of the current-mode RF front-end with the low-noise transconductance amplifier 206 followed by the 25% duty-cycle passive-mixer 208 operating in current domain, followed by the transimpedance amplifiers (TIAs) 210. Such RF front-ends are widely used in state of the art receiver signal chains. The transconductance amplifier 206 converts the LNA input signal $v_{in}$ 230 to a current proportional to the transconductance $g_m$. The current mode 25% duty cycle mixer 208 down-converts the current frequency. The mixer 208 supplies quadrature currents down converted from RF to the transimpedance amplifiers (TIAs) 210. The capacitors C2 in the mixer 208 filter out signal components that are around two times the local-oscillator (LO) frequency (2×LO harmonics) from the current $i_{in}$ supplied to the TIA 210. The LNA input signal goes through amplification and filtering. Voltage gain is set by the LNA's transconductance ($g_m$) and the transimpedance of R1 in parallel with C1 in TIAs 210. The voltage domain signal goes through filtering formed by R1 and C1. The TIAs 210 omit showing the wide-band sense outputs shown in FIG. 2 for ease of illustration.

The TIA input current is proportional to the strength of the input signal and ideally does not go through filtering at baseband for power detection purposes. If the baseband current can be converted into a voltage, its strength can be detected by a base-band peak or rms detector. The detection is wide-band and can be more accurate than an RF power detector solution at the LNA input as the TIA input signal is amplified by the front-end as compared to the LNA input.

The differential voltage gain (G) at the TIA output is given by $$G = \frac{voutin - voutip}{vin},$$

where voutin−voutip is the I-channel differential voltage at the output of the TIA at nodes 301 and 303, where $v_{in}$ is the voltage at LNA input and it is converted to current with the current expression $g_m v_{in}$, which is the input current to the mixer. Here $g_m$ is the transconductance of the LNA. Note that $1^{st}$ order filtering characteristics are included in the following gain expression:

$$G(s) = \frac{\sqrt{2}}{\pi}\frac{g_m R_1}{1 + sR_1C_1}$$

In the gain expression above $$\frac{\sqrt{2}}{\pi}$$

is the conversion gain of the mixer.

The load current $i_L$ 302 from node 301 is given by $$i_L = \frac{v_{outin}}{R_L},$$

and $i_x$, the current absorbed (or sunk) by the amplifier, is given by $$i_x = i_{in} - i_L.$$

In FIG. 3 note that outin and outpn at nodes 301 and 303 respectively represent the negative and positive differential I-channel outputs from TIA 209 and outqn and outqp at nodes 305 and 307 respectively represent the negative and positive differential Q-channel outputs from the TIA 211.

Figure 4:
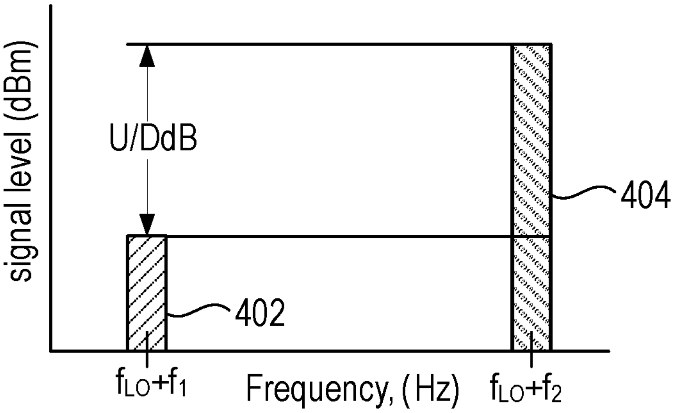
FIG. 4 illustrates desired and undesired received signals at the LNA input.
Figure 5:
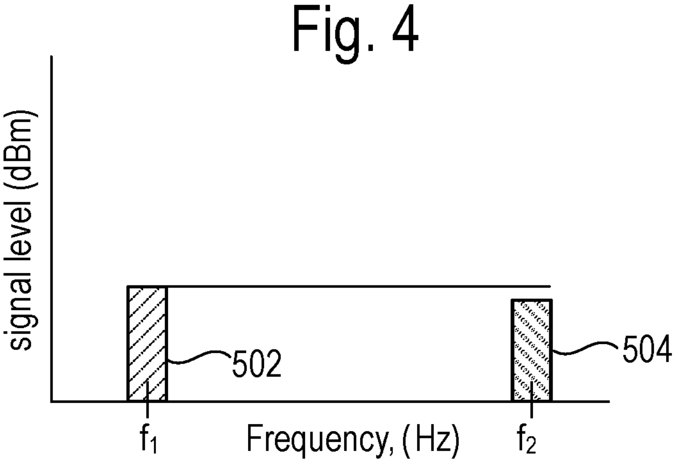
FIG. 5 illustrates desired and undesired received signals at the TIA output showing attenuation of the undesired signal.
Figure 6:
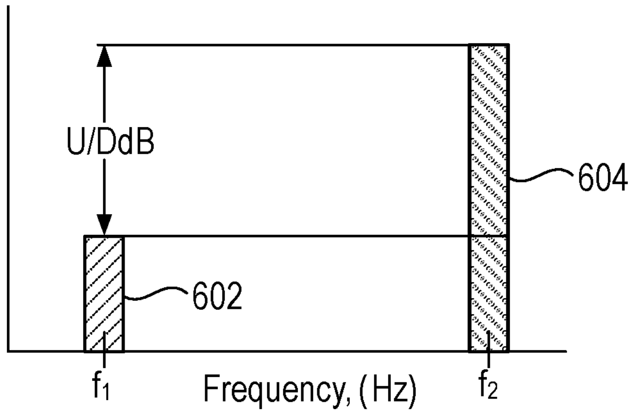
FIG. 6 illustrates the received signals at the TIA output wide-band sensing nodes.

FIGS. 4 through 6 illustrate the signals at various points in the receive path. FIG. 4 illustrates the signal at the LNA input. A desired signal 402 is located at a first frequency $f_{LO}$+f1 where $f_{LO}$ is the local oscillator frequency of the receiver and f1 is an offset from $f_{LO}$. A blocker signal 404 is located at $f_{LO}$+f2, where f2 is another frequency offset from $f_{LO}$. The blocker signal is $U/D_{dB}$ stronger than the desired signal, where U is the undesired signal power and D is the desired signal power. FIG. 5 illustrates the signal at the TIA output (outip−outin). The desired signal 502 is located at f1 and the blocker signal 504 is located at f2. The blocker signal 504 is attenuated by the filtering profile of the TIA. Thus, the attenuation can make the blocker signal appear to have lower power than the desired signal 502, which is shown in FIG. 5. The attenuated blocker level is not a good indicator of the signal level at the RF input to the LNA input. Thus, detection by a power/peak detector 120 (see FIG. 1) placed at the TIA output (outpi−outni) and (outqp−outqn) may not be accurate, particularly if the frequency separation between f1 and f2 is large resulting in significant attenuation of the blocker signal.

FIG. 6 illustrates the signal at the TIA output wide-band sensing nodes (wb_outp_i−wb_outn_i) shown in FIG. 2. The wide-band sensing nodes provide a voltage that indicates the current at the input to the TIA without being affected by the filtering characteristics of the TIA. The desired signal 602 is located at f1 and a blocker signal 604 located at f2. Note that the blocker is not attenuated with respect to the desired signal and is separated from the desired signal 402 by U/D dB. Thus, a peak detector coupled to the wide-band sensing nodes can accurately sense the blocker signal. In addition, very low amplitude RF signals that cannot be detected at the peak detector coupled to the LNA input can be detected at the wide-band sensing nodes as the signal is amplified by the LNA, mixer and TIA circuits. Typical amplification is in the order of 30-40 dB (30×-100×). Thus, detection can be more accurate due to signal amplification.

Figure 7:
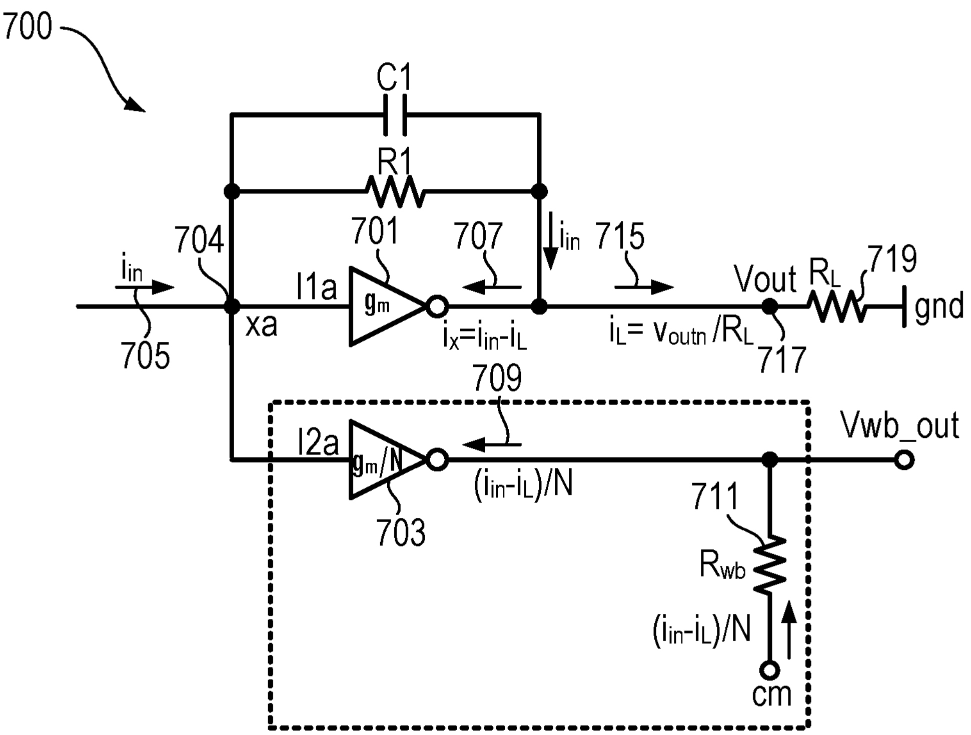
FIG. 7 illustrates an embodiment for sensing the current at the input to the TIA but is output voltage dependent.

FIG. 7 illustrates an embodiment 700 for sensing the current at the input to the TIA. Amplifier I1*a* 701 is the main amplifier. Sensing amplifier I2*a* 703 helps sense the input current and is a scaled down version of I1*a* (1/N), scaled down by a factor of N. Thus, the transconductance of amplifier I2*a* 703 is $g_m$/N. The sensing node xa 704, which is common to both amplifiers I1*a* and I2*a*, receives input current $i_{in}$ 705. The load current $i_L$ is set by Vout/$R_L$, where Vout is the voltage at the output node 717 and $R_L$ is the load resistance 719. $R_L$ is typically the input impedance of the stage following the TIA. The amplifier I1*a* generates the current 707, which is determined by $g_m \times v_{xa} = i_{in} - i_L$, where $v_{xa}$ is the voltage at node xa 704 and $i_L$ is the load current 715. The amplifier I2*a* 703 generates the current 709 (($i_{in}$−$i_L$)/N). The wideband sensing resistor $R_{wb}$ 711 converts the current ($I_{in}$−$I_L$)/N into the voltage $R_{wb}(I_{in}-i_L)/N$. However, since the load current $i_L$ 715 is output voltage (Vout) dependent, the measurement is not accurate as the output voltage Vout at output node 717 is affected by the filtering profile of the TIA determined by C1 and R1. Thus, the lack of a mechanism to compensate for load current results in a potentially inaccurate conversion from the input current $i_{in}$ 705 to a voltage for power detection (peak or RMS).

Figure 8:
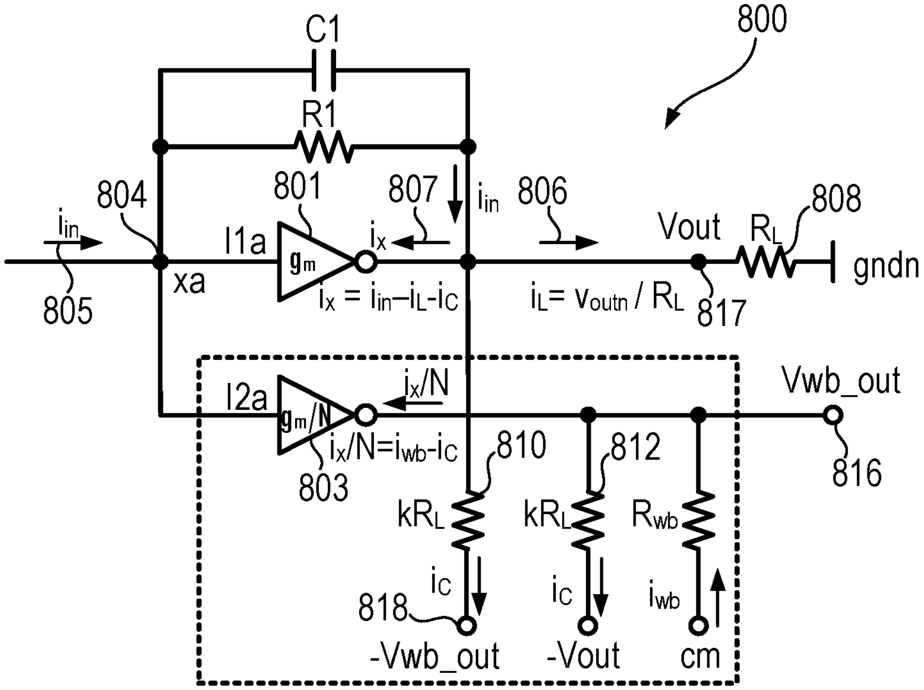
FIG. 8 illustrates an embodiment of a TIA with wide-band current sensing outputs that generate a representation of the input current independent of TIA filter characteristics.

FIG. 8 illustrates an embodiment 800 that can be used in the wide-band baseband peak detector approach described herein. The embodiment 800 provides load current compensation while sensing the current at the input to the amplifiers 801 and 803. Amplifier I1*a* 801 is the main amplifier. Sensing amplifier I2*a* 803 is a scaled down version of amplifier I1*a* (1/N), scaled down by a factor of N. Thus, the transconductance of amplifier I2*a* 803 is $g_m$/N. The sensing node xa 804, which is common to both I1*a* and I2*a*, receives input current $i_{in}$ 805. The load current $i_L$ 806 is set by Vout/$R_L$, where Vout is the voltage at the output node 817 and $R_L$ is the load resistance 808. The amplifier I1*a* 801 generates the current $i_x$ 807, where $$i_x = i_{in} - i_C - i_L,$$

where $i_C$ is a scaling factor for cross coupling resistors 810 and 812, which are chosen to be k times larger than the load resistor $R_L$. Cross coupling resistor 812 with a resistance value k×$R_L$ is placed between the negative side −Vout node of the main amplifier and the wide-band measurement node Vwb_out 816. The embodiment illustrated in FIG. 8 assumes a differential version of the TIA is being used as shown, e.g., in FIG. 10. The negative side of the differential amplifier has −Vout at its output while the positive side has Vout. The cross-coupling resistor 810 is coupled between the output of TIA I1*a* 801 and −Vwb_out 818. The output −Vwb_out 818 is coupled to the output of a negative sensing amplifier, which corresponds to the positive sensing amplifier 803 and is in the negative portion of the differential amplifier.

In an embodiment the value of k is selected so that Vwb_out has no $I_L$ dependence (and thus no dependence on the output voltage Vout) and instead depends on $i_{in}$. That is Vwb_out is not affected by the filter characteristics of the TIA determined by the R1 and C1. The following equations define the operation of the portion of the differential amplifier shown in FIG. 8. The output current $i_x$ is defined as:

$$i_x = i_{in} - i_C - i_L, \quad \text{Eq 1}$$

$$\frac{i_x}{N} = i_{wb} - i_C \quad \text{Eq 2}$$

Substituting $i_x$ from Eq 2 into Eq 1

$$i_{wb} = \frac{1}{N} i_{in} - \frac{1}{N} i_L + \frac{N-1}{N} i_C \quad \text{Eq. 3}$$

Note that the equations for the load current $i_L$ the current on cross-coupling resistors $i_C$ and the current provided to wide-band sensing network resistor $i_{wb}$ are given by $$i_L = Vout/R_L \quad \text{Eq. 4a}$$

$$i_C = (Vout + \text{Vwb\_out})/kR_L \quad \text{Eq. 4b}$$

$$i_{wb} = -\text{Vwb\_out}/R_{wb} \quad \text{Eq. 4c}$$

Substituting current equations from Eq 4a, b, and c into Eq. 3 one can obtain the expression $$-\frac{\text{Vwb\_out}}{R_{wb}} = \frac{1}{N} i_{in} - \frac{Vout}{NR_L} + \frac{N-1}{N} \frac{Vout + \text{Vwb\_out}}{kR_L} \quad \text{Eq. 5}$$

If k is chosen to be N−1 (k=N−1) one can show that Vwb_out is independent of Vout (or in other words load filtering) and is given by $$\text{Vwb\_out} = -\frac{R_{wb}}{N} \frac{1}{1 + R_{wb}/NR_L} i_{in} \quad \text{Eq. 6}$$

For example, if N=4 is chosen then k becomes 3 (i.e., cross coupling resistors 810 and 812 are chosen to have 3 times the resistance of the load resistors.

For $NR_L >> R_{wb}$ (which is typically the case)

$$\text{Vwb\_out} \cong -\frac{R_{wb}}{N} i_{in}. \quad \text{Eq. 7}$$

Figure 9:
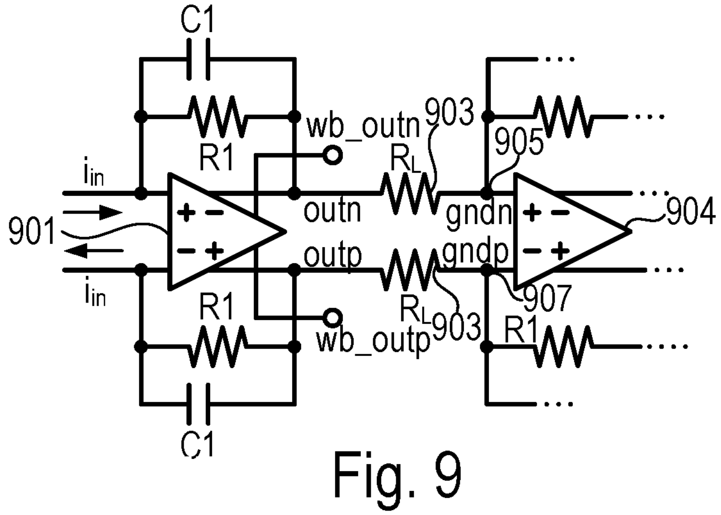
FIG. 9 illustrates a differential embodiment of the TIA with wideband input current sensing.

FIG. 9 illustrates a differential embodiment of the TIA 901 with wideband signal differential sensing on output nodes wb_outp and wb_outn. The load resistance $R_L$ 903, corresponding the load resistance in FIG. 8, is the equivalent load resistance of the TIA 901 and could be, for example, the input resistance of a filter stage 904 that follows the TIA 901. The filter stage 904 may be, e.g., a low pass filter. Normally gndn 905 and gndp 907 are virtual grounds of an amplifier. The "p" and "n" letters refer to positive and negative for the differential amplifiers shown.

Figure 10:
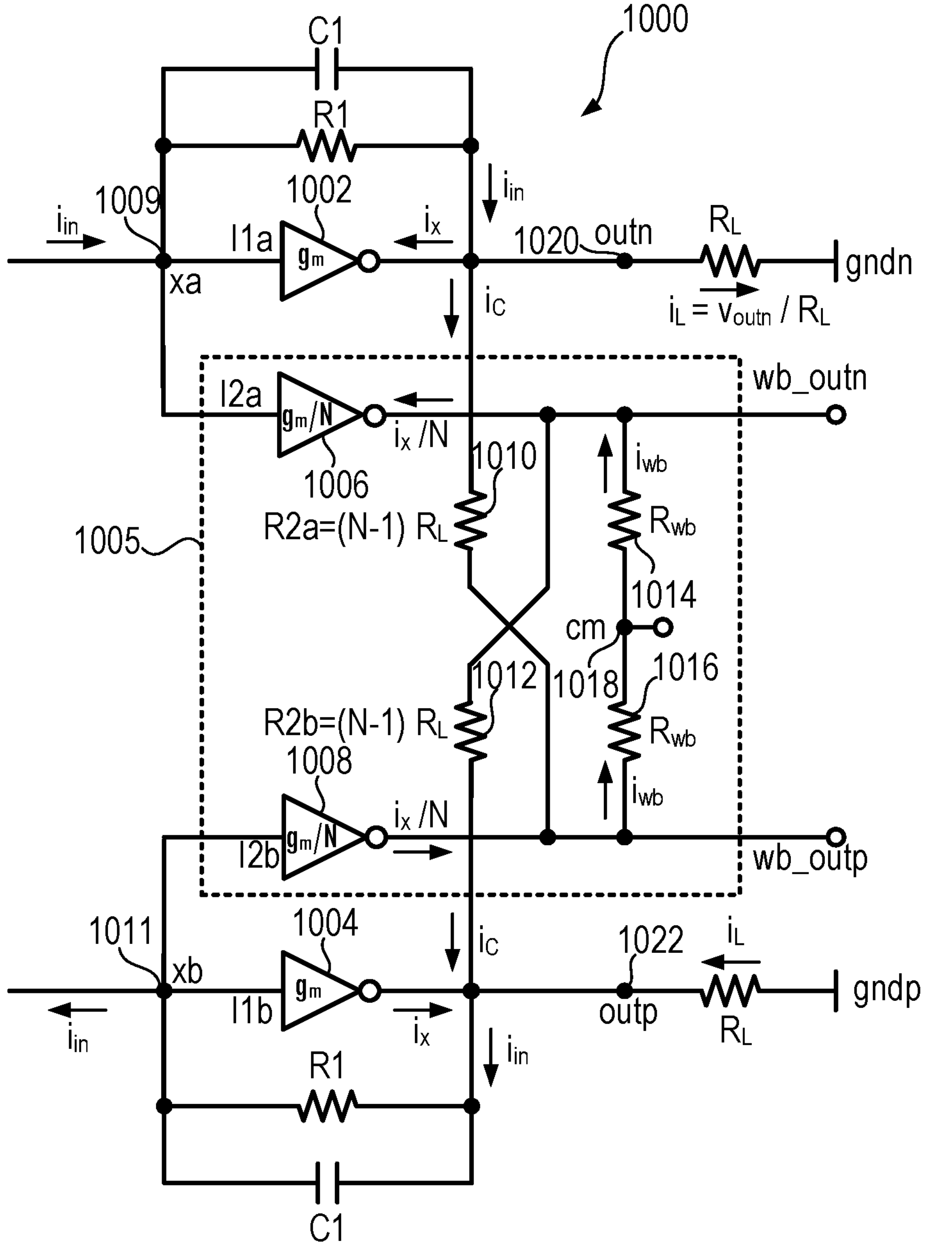
FIG. 10 illustrates a high-level diagram of an embodiment of a single stage differential TIA with wideband input current sensing.

FIG. 10 illustrates a high level diagram of a single stage differential TIA 1000 with wideband signal differential sensing, having an inverter based transconductance stage. The TIA 1000 is an embodiment of the TIA with wide-band signal sensing shown in FIG. 9. The differential TIA 1000 includes main amplifiers 1002 and 1004 and the input current sensing block 1005. The current sensing circuit 1005 includes scaled down amplifiers 1006 and 1008. The sensing node xa 1009 is common to amplifiers I1*a* 1002 and I2*a* 1006. The sensing node xb 1011 is common to the amplifiers I1*b* 1004 and I2*b* 1008. The current sensing block further includes the cross coupled resistors R2*a* 1010 and R2*b* 1012 and the two wide band resistors Rwb 1014 and 1016 coupled to the common mode (cm) node 1018. The differential output voltage for use by the power detector (peak or RMS) is formed across the two resistors Rwb. The two cross coupled resistors cancel the load current component otherwise present in the voltage across resistors Rwb. Resistors Rwb 1014 and 1016 have a resistance value of (N−1) $R_L$. Note that N has to be greater than one, e.g., 1.5 or 2.5. Preferably, N should be chosen greater than 2 such that sensing circuitry takes less current than the main amplifier (so that k>1). The current sensing block 1005 replicates the input current without filtering and directs that current through resistors $R_{wb}$ to form a voltage proportional to the input current $i_{in}$ which is proportional to the LNA input signal. Voltage between terminals wb_outp and wb_outn is (2/N)×$i_{in}$×$R_{wb}$. From a small-signal perspective voltages are determined by total current ($i_x$) provided by the $g_m$ stages (see Eq. 1 above).

The current provided by the scaled down stages is $i_x$/N. Since $i_x$ depends in part on the load current $i_L$, any current component dependent on $i_L$ needs to be removed from the input current sensing branch to accurately recreate the input current. The cross-coupled resistors R2*a* and R2*b* perform that function. The cross coupled resistor R2*a* 1010 is coupled between the negative output node (outn) 1020 and the output of the positive scaled down TIA 1008. The cross coupled resistor R2*b* 1012 is coupled between the positive output node (outp) 1022 and the output of the negative scaled down TIA 1006. In the main TIAs the resistors R1 and capacitors C1 form the first order low-pass filters with a low-frequency transimpedance equal to R1.

Figure 11:
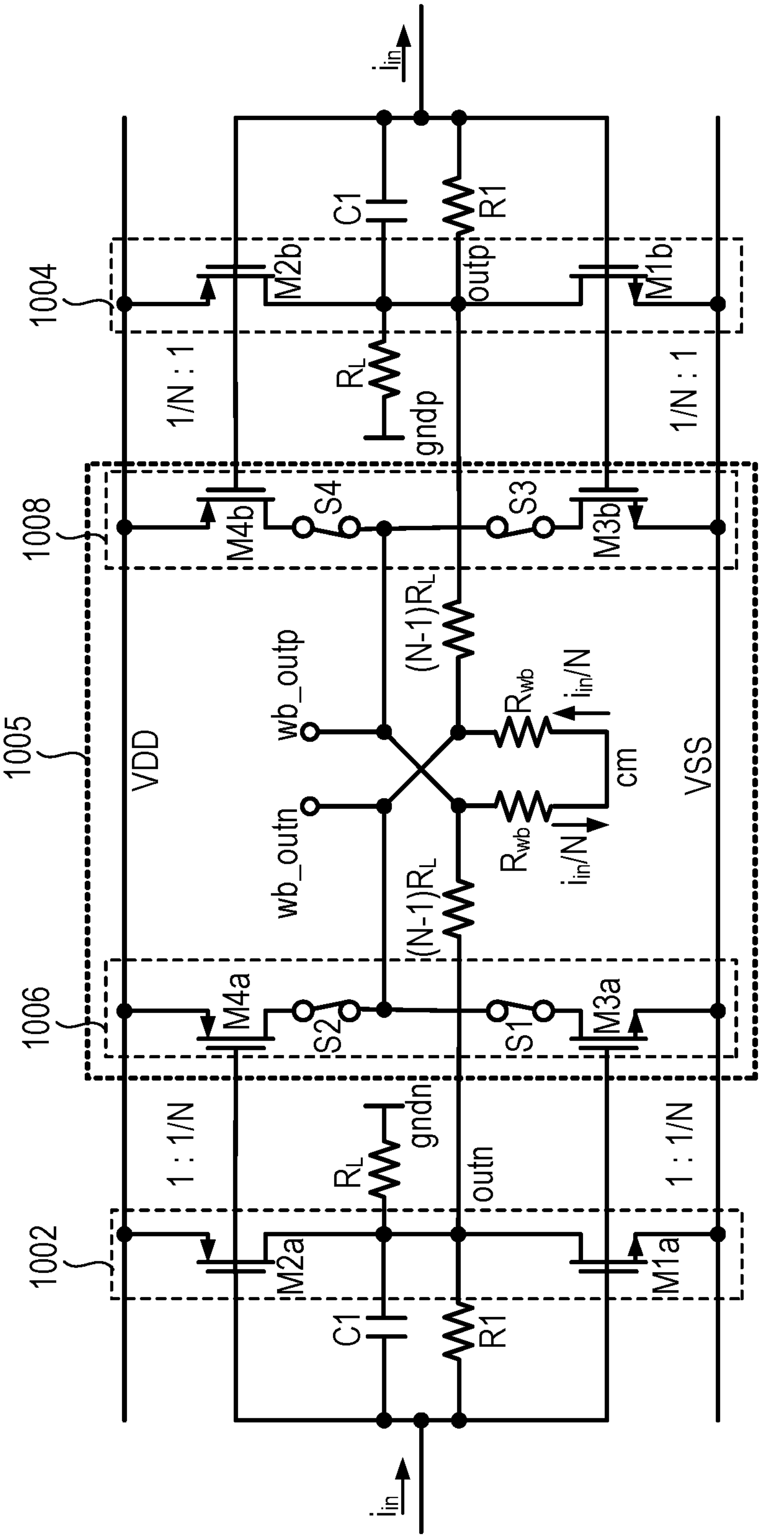
FIG. 11 shows a transistor level embodiment of the TIA with wide-band input current sensing shown in FIG. 10.

FIG. 11 shows a transistor level implementation of the TIA with wide-band signal sensing shown in FIG. 10. An example scaling factor for N is 4. For N=4 $R_{2a}=R_{2b}=3\ R_L$. Transistor M1*a* and M2*a* form amplifier I1*a* 1002. Transistors M1*b* and M2*b* form amplifier I1*b* 1004. Transistors M3*a* and M4*a* form scaled down amplifier I2*a* 1006 and transistors M3*b* and M4*b* form amplifier I2*b* 1008. Switches S1, S2, S3, and S4 allow the current sensing circuit 1005 to be turned off when not in use. In an embodiment, the power detector is only utilized at the beginning of a reception, e.g., during the header portion of a packet and thus the current sensing circuit 1005 can be turned off for the remainder of the reception until the next reception starts.

Figure 12:
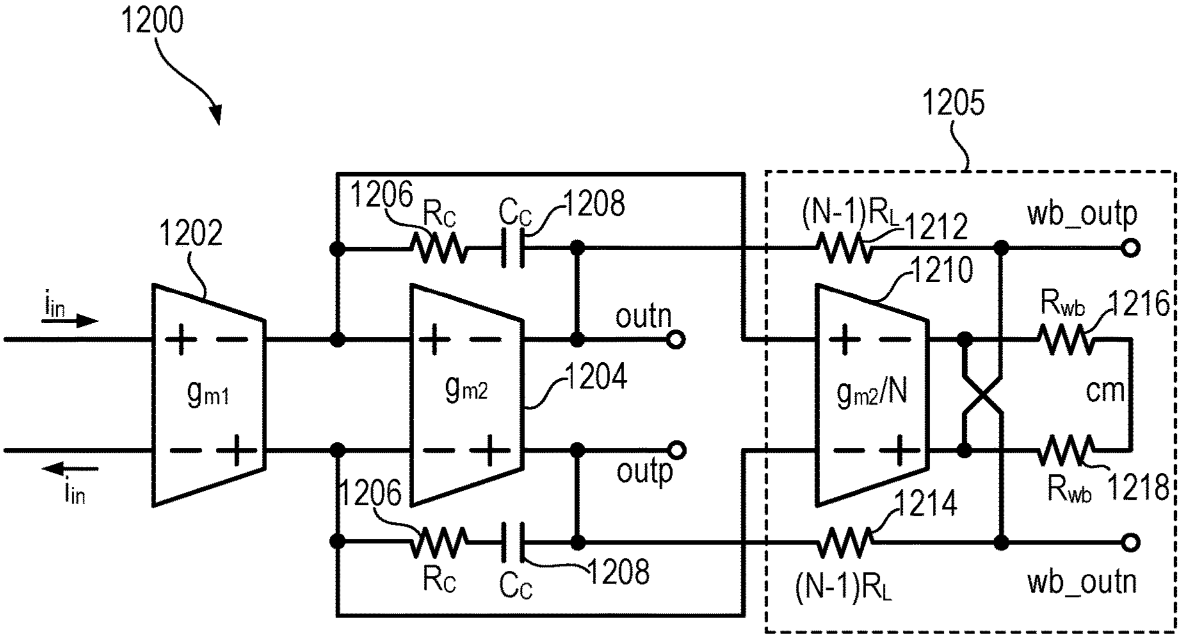
FIG. 12 illustrates another embodiment of an amplifier with wide-band signal input current sensing that utilizes a fully differential two-stage amplifier.

FIG. 12 illustrates another embodiment of an amplifier 1200 with wide-band signal sensing that utilizes a fully-differential two-stage amplifier. In an embodiment, the amplifier 1200 is used for amplifier 209 (see FIG. 2). The amplifier with the R1 and C1 network (shown in FIG. 2 but not shown in FIG. 12) across the input and output of the amplifier forms the TIA. A second amplifier identical to amplifier 1200 is used for amplifier 211 to handle the two differential current signals supplied by mixer 208. The amplifier 1200 utilizes a two-stage Miller amplifier with input current sensing capability. The main amplifier is implemented with the two stages 1202 ($g_{m1}$) and 1204 ($g_{m2}$), which form the core of the main amplifier. The resistors $R_C$ 1206 and $C_C$ 1208 form the Miller compensation network. The current sensing network 1205 includes amplifier 1210, which is a scaled down version of amplifier 1204 ($g_{m2}$) with scaling factor of N resulting in a transconductance of ($g_{m2}$/N). The current sensing function also includes the cross-coupled resistors 1212 and 1214 and the output resistors $R_{wb}$ 1216 and 1218 that provide the differential voltage corresponding to the input current $i_{in}$ to the peak or RMS power detector (not shown in FIG. 12).

Figure 13:
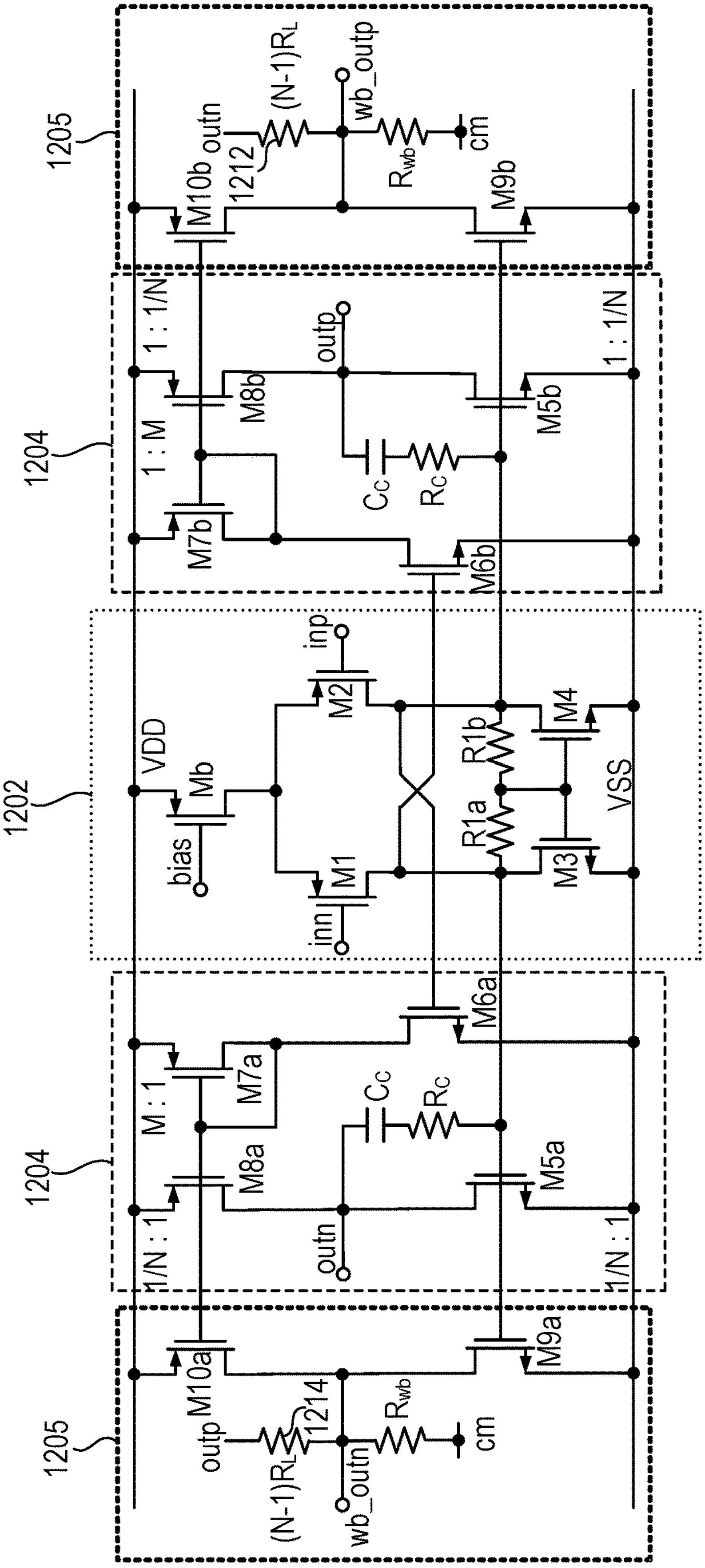
FIG. 13 shows implementation details of an embodiment of the fully differential two-stage amplifier with wideband current sensing capability shown in FIG. 12.

FIG. 13 shows implementation details of an embodiment of the fully-differential two-stage amplifier with wideband current sensing capability shown in FIG. 12. The amplifier 1202 ($g_{m1}$) is implemented with transistors Mb, M1, M2, M3, M4 and resistors R1*a* and R1*b*. The amplifier 1204 ($g_{m2}$) is implemented with transistors M5*a*, M6*a*, M7*a*, M8*a*, M5*b*, M6*b*, M7*b*, and M8*b*. The current sensing network 1205 is implemented with transistors M9*a*, M10*a*, M9*b*, M10*b*, and the cross coupled resistors 1212 and 1214 with resistance values (N−1) $R_L$ and the wideband output resistors $R_{wb}$. The Miller compensation network is formed by $R_C$ and $C_C$. Note that the common mode feedback loop is not shown in FIG. 13. Although not shown in FIG. 13, in embodiments the current sensing network 1205 is shut off when not in use to save power. While FIGS. 10-13 show several amplifier topologies, other topologies are also possible.

Figure 14:
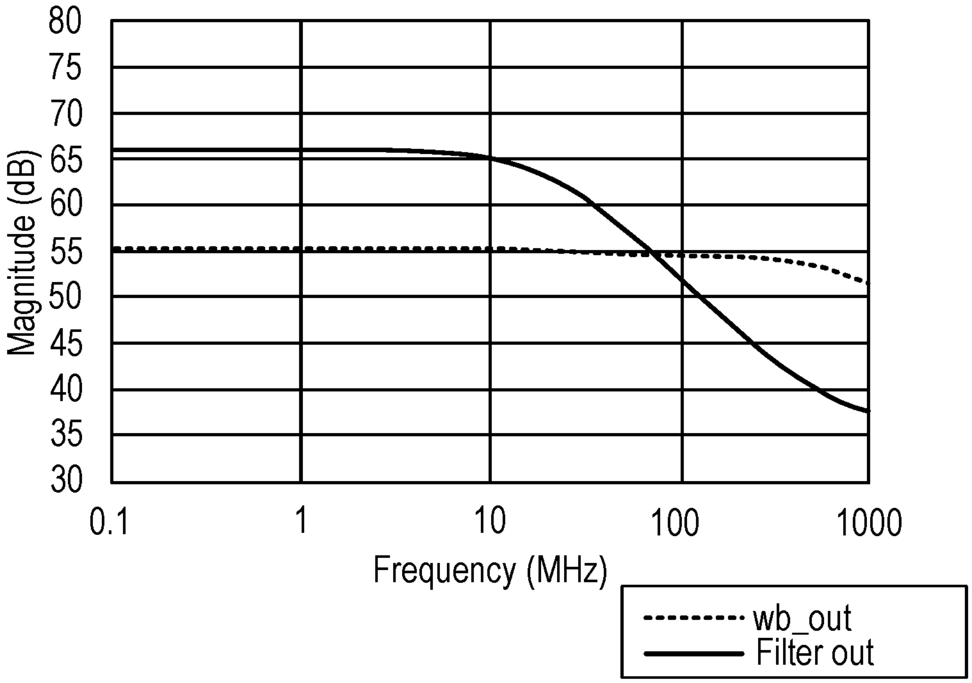
FIG. 14 illustrates simulation results of transfer functions at the signal path output and the current sensing output.

FIG. 14 illustrates simulation results of transfer functions at the normal signal path output and the current sensing output. The TIA-3 dB corner frequency for the signal path signals is set to 20 MHz in this example. The wideband sensing wideband sensing path has-3 dB bandwidth (BW) of around 1 GHz. The wideband sensing path BW is mainly set by $R_{wb}$ and loading capacitor of the peak detector (BW=1/$R_{wb}$ $C_{pkd}$) that receives the wideband sensing outputs wb_outp and wb_outn, where $C_{pkd}$ is the effective input capacitance of the peak detector. In the example of FIG. 14, the gain of the current detection path (WBdetect out) is set about 10 dB lower than the TIA output by setting a low $R_{wb}$ value in order to extend the detection bandwidth. The wide detection bandwidth facilitates detection of out of band blockers.

Figure 15:
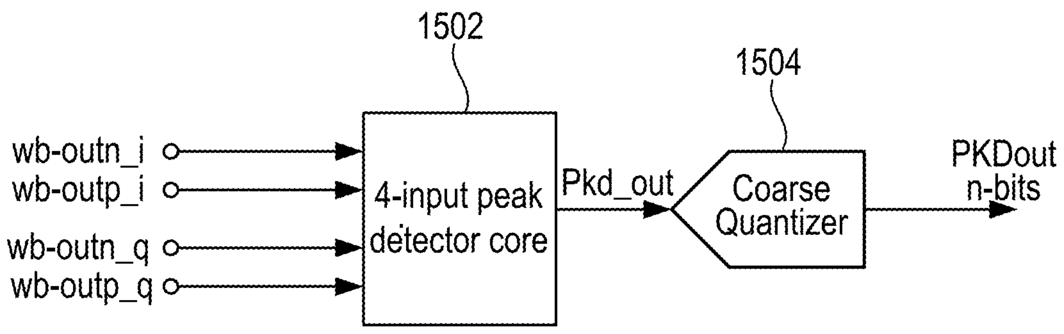
FIG. 15 is a high level block diagram of an embodiment of a peak detector.

Referring again to FIG. 2, each TIA 209 and 211 shown in FIGS. 2 and 3 is formed by one of the various embodiments of differential amplifiers with wideband current sensing shown in FIGS. 9-13. In embodiments the power detector 218 is implemented as a peak detector shown in one embodiment in the high-level block diagram of a peak detector shown in FIG. 15. A four-input peak detector includes a peak detector core 1502 followed by a quantizer 1504 that generates a peak detector output of n-bits. The quantizer may be, e.g., a 5-level flash analog to digital converter (ADC) with dB-uniform steps. The n-bit peak detector output is supplied to the AGC control 222 (see FIG. 2) for use in adjusting the gain in the receive path to the desired level. Note that while a single peak detector is shown in FIG. 15 to handle the four differential quadrature signals, in other embodiments a peak detector is used for each differential signal pair as shown in FIG. 2. One four input peak detector is described in detail in U.S. Pat. No. 10,033,364 entitled “Low Power Compact Peak Detector With Improved Accuracy” filed May 31, 2017 and naming Abdulkerim L. Coban as inventor, which application is incorporated herein by reference. Of course, other embodiments use different peak detectors or use RMS detectors, both of which are well known in the art. The output of the power detectors, as stated earlier, is used to control the gain of LNA 206 and/or the TIA 210.

Thus, various embodiments of amplifiers with wideband current sensing have been described. The description of the invention set forth herein is illustrative and is not intended to limit the scope of the invention as set forth in the following claims. The terms such as “first” and “second”, as used in the claims, unless otherwise clear by context, are used distinguish between different items in the claims and do not otherwise indicate or imply any order in time, location, or quality. Other variations and modifications of the embodiments disclosed herein, may be made based on the description set forth herein, without departing from the scope of the invention as set forth in the following claims.

What is claimed is:

1. A method comprising:

receiving a differential input current at a transimpedance amplifier (TIA) with input current sensing in a baseband portion of a receiver chain of a radio frequency (RF) receiver; and generating a current sense differential output voltage on a first output node and a second output node of the TIA, the current sense differential output voltage corresponding to the differential input current to the TIA; and compensating for load current from the TIA while sensing the differential input current to cause the current sense differential output voltage to be independent of the load current and thereby independent of filter characteristics of the TIA.

2. The method as recited in claim 1 further comprising:

generating a signal path differential output voltage on a third output node and a fourth output node of the TIA, the signal path differential output voltage being indicative of the differential input current, the signal path differential output voltage being dependent on the filter characteristics of the TIA.

3. The method as recited in claim 2 further comprising:

generating a first output voltage of the current sense differential output voltage with a first current sense amplifier on a first current sense output node;

generating a second output voltage of the current sense differential output voltage with a second current sense amplifier on a second current sense output node;

generating a third output voltage of the signal path differential output voltage with a first amplifier circuit on a first signal path output node;

generating a fourth output voltage of the signal path differential output voltage with a second amplifier circuit on a second signal path output node;

and wherein the first amplifier circuit and the second amplifier circuit have a transconductance of $g_m$ and the first current sense amplifier and the second current sense amplifier have a transconductance of $g_m/N$, where N is greater than 1.

4. The method as recited in claim 3 further comprising generating the third output voltage using a first load current across a first load resistor having a resistance value $R_L$ and generating the fourth output voltage using a second load current across a second load resistor having the resistance value $R_L$.

5. The method as recited in claim 4 wherein compensating for the load current further comprises:

compensating for the first load current and the second load current using a first compensation resistor coupled between the first current sense output node and the second signal path output node and using a second compensation resistor coupled between the second current sense output node and the first signal path output node, the compensating for load currents being used to generate the differential current sense output voltage independent of the filter characteristics of the TIA.

6. The method as recited in claim 5 wherein the first compensation resistor and the second compensation resistor have a resistance value of $k \times R_L$ where $k=N-1$.

7. The method as recited in claim 2 further comprising supplying the current sense differential output voltage to a peak detector circuit and generating a peak detector output indicative of a peak voltage.

8. The method as recited in claim 7 further comprising controlling a gain of at least one amplifier in the RF receiver using the peak detector output.

9. The method as recited in claim 7 further comprising turning off a current sensing network used to generate the differential current sense output voltage after the peak voltage is determined and while portions of the TIA generating the signal path differential output voltage are still powered.

10. A radio frequency (RF) receiver comprising:

a differential transimpedance amplifier (TIA) with input current sensing, the TIA including, a first branch including a first amplifier circuit coupled to receive a first input current and supply a first output voltage on a first output node;

a second branch including a second amplifier circuit coupled to receive a second input current and supply a second output voltage on a second output node;

a current sensing circuit including a first current sense amplifier circuit and a second current sense amplifier circuit coupled respectively to the first input current and the second input current, the current sensing circuit to supply a third output voltage on a third output node indicative of the first input current and a fourth output voltage on a fourth output node indicative of the second input current; and wherein the current sensing circuit includes a load current compensation circuit.

11. The RF receiver as recited in claim 10, wherein the first amplifier circuit has a transconductance of $g_m$ and the first current sense amplifier circuit has a transconductance of $g_m/N$, where N is greater than 1; and wherein the second amplifier circuit has a transconductance of $g_m$ and the second current sense amplifier circuit has a transconductance of $g_m/N$, where N is greater than 1.

12. The RF receiver as recited in claim 10 wherein the first amplifier circuit generates the first output voltage across a first load resistor having a resistance value $R_L$ using a first load current and the second amplifier circuit generates the second output voltage across a second load resistor having the resistance value $R_L$ using a second load current.

13. The RF receiver as recited in claim 12, wherein the load current compensation circuit includes a first compensation resistor coupled between the first output node and the fourth output node and a second compensation resistor coupled between the second output node and the third output node; and wherein the first compensation resistor and second compensation resistor have a resistance value of $k \times R_L$ where $k=N-1$.

14. The RF receiver as recited in claim 10 further comprising:

at least one peak detector circuit coupled to the current sensing circuit to generate a peak detector output indicative of a detected peak voltage; and wherein a gain of at least one amplifier in a receive chain of the RF receiver is controlled using the peak detector output.

15. The RF receiver as recited in claim 14 wherein the at least one amplifier is a low noise amplifier (LNA) in the receive chain.

16. The RF receiver as recited in claim 10 further comprising:

a second TIA with input current sensing, the second TIA including, a third branch including a fifth amplifier circuit coupled to receive a third input current and supply a fifth output voltage on a fifth output node;

a fourth branch including a sixth amplifier circuit coupled to receive a fourth input current supply a sixth output voltage on a sixth output node;

a second current sensing circuit including a third current sense amplifier circuit and a fourth current sense amplifier circuit coupled respectively to the third input current and the fourth input current, the second current sensing circuit to supply a seventh output voltage on a seventh output node indicative of the third input current and an eighth output voltage on an eighth output node indicative of the fourth input current; and wherein the second current sensing circuit includes a second load current compensation circuit including a fifth resistor coupled between the fifth output node and the eighth output node and a sixth resistor coupled between the sixth output node and the seventh output node.

17. The RF receiver as recited in claim 10 further comprising:

a passive network providing a radio frequency (RF) signal;

a low noise amplifier (LNA) coupled to the passive network to convert the RF signal to an RF current at an RF frequency; and a mixer to convert the RF current to differential quadrature currents having a baseband frequency or an intermediate frequency (IF), the differential quadrature currents including the first input current and the second input current.

18. The RF receiver as recited in claim 10, wherein the TIA comprises a two-stage Miller amplifier.

19. The RF receiver as recited in claim 10 further comprising switches coupled to turn off the current sensing circuit while other portions of the TIA generating the first output voltage and the second output voltage remain powered.

20. A radio frequency (RF) receiver comprising:

a first amplifier circuit configured to generate a first output voltage on a first output node, the first output voltage corresponding to a first input current to the first amplifier circuit, and the first output voltage being dependent in part on filter characteristics of the first amplifier circuit;

a second amplifier circuit to generate a second output voltage on a second output node, the second output voltage corresponding to a second input current to the second amplifier circuit and the second output voltage dependent in part on filter characteristics of the second amplifier circuit;

a current sense circuit including, a first current sense amplifier to generate a first current sense voltage on a first current sense output node, the first current sense voltage being indicative of the first input current and being independent of the filter characteristics of the first amplifier circuit;

a second current sense amplifier to generate a second current sense voltage on a second current sense output node, the second current sense voltage being indicative of the second input current and being independent of the filter characteristics of the second amplifier circuit; and a load current compensation circuit that includes a first compensation resistor coupled between the first output node and the second current sense output node and a second compensation resistor coupled between the second output node and the first current sense output node; and wherein the first amplifier circuit and the second amplifier circuit have a transconductance of $g_m$ and the first current sense amplifier and the second current sense amplifier have a transconductance of $g_m/N$, where N is greater than 1.

21. The RF receiver as recited in claim 20, wherein the first amplifier circuit develops the first output voltage using a first load current across a first load resistor having a resistance value $R_L$ and the second amplifier circuit develops the second output voltage using a second load current across a second load resistor having the resistance value $R_L$, and wherein the first compensation resistor and second compensation resistor have a resistance value of $k \times R_L$ where $k=N-1$.

* * * * *